(12) United States Patent
Hagiwara

(10) Patent No.: US 9,547,148 B2
(45) Date of Patent: Jan. 17, 2017

(54) LENS DRIVING DEVICE

(71) Applicants: Huizhou Dayawan Ever Bright Electronic Industry Co., Ltd., Huizhou (CN); JSS Optical Technology Co., Ltd., Hong Kong (HK); Huizhou Daya Bay Jss Optical Technology.Co., Ltd., Huizhou (CN)

(72) Inventor: Kazuyoshi Hagiwara, Kanagawa (JP)

(73) Assignees: HUIZHOU DAYAWAN EVER BRIGHT ELECTRONIC INDUSTRY CO, Huizhou (CN); JSS OPTICAL TECHNOLOGY CO., LTD., Hong Kong (HK); HUIZHOU DAYA BAY JSS OPTICAL TECHNOLOGY.CO., LTD., Huizhou (CN)

( * ) Notice: Subject to any disclaimer, the term of this patent is extended or adjusted under 35 U.S.C. 154(b) by 0 days.

(21) Appl. No.: 14/672,105

(22) Filed: Mar. 28, 2015

(65) Prior Publication Data

US 2015/0277081 A1  Oct. 1, 2015

(30) Foreign Application Priority Data

Mar. 31, 2014  (JP) .................................. 2014-073339

(51) Int. Cl.
*G02B 7/02* (2006.01)
*G02B 7/09* (2006.01)
(Continued)

(52) U.S. Cl.
CPC .. *G02B 7/09* (2013.01); *G02B 7/08* (2013.01); *G02B 7/00* (2013.01); *G02B 7/026* (2013.01); *G03B 13/36* (2013.01)

(58) Field of Classification Search
CPC ......... G02B 21/362; G02B 7/023; G02B 7/02; G02B 7/022; G02B 7/00; G02B 7/08; G02B 7/026; G02B 7/09; G03B 13/36
(Continued)

(56) References Cited

U.S. PATENT DOCUMENTS 6,804,068 B2 * 10/2004 Sasaki .................... G02B 7/102
359/811
7,880,983 B2 * 2/2011 Hagiwara ................ G02B 7/08
359/819
(Continued)

FOREIGN PATENT DOCUMENTS

CN 102263472 A 11/2011
CN 202230236 U 5/2012

OTHER PUBLICATIONS

SIPO, Search Report and Notification of First Office Action, App. No. 201510135459.7.

*Primary Examiner* — Ricky Mack
*Assistant Examiner* — Daniele Manikeu
(74) *Attorney, Agent, or Firm* — Hemisphere Law, PLLC

(57) ABSTRACT

The present invention provides a lens driving device which can limit rotations caused by torque generated when a lens is inserted or disassembled. The state that the lens driving device is damaged can be distinguished, and the finished product rate and reliability of a camera assembly are improved more easily. The lens driving device includes a lens support, a coil disposed on the lens support, a fixing assembly and springs for supporting the lens support to move along the optical axis, and a magnet yoke. Extruding clamping parts closer to the upper side than a mounting surface for the springs to mount are arranged on the lens support, the magnet yoke is provided with bending parts extending from the edge part of the opening part down- (Continued)

wardly, and the bending parts of the magnet yoke are located closer to the upper side than the mounting surface.

1 Claim, 13 Drawing Sheets

(51) Int. Cl.
*G02B 7/08* (2006.01)
*G03B 13/36* (2006.01)
*G02B 7/00* (2006.01)

(58) Field of Classification Search
USPC .......................................... 359/694, 811–824
See application file for complete search history.

(56) References Cited

U.S. PATENT DOCUMENTS

| | | | |
|---|---|---|---|
| 2010/0061712 A1* | 3/2010 | Akabane | G02B 7/08 396/439 |
| 2010/0214675 A1* | 8/2010 | Kugler | G02B 7/021 359/811 |
| 2011/0176046 A1* | 7/2011 | Hu | G02B 7/08 348/335 |
| 2011/0291495 A1 | 12/2011 | Lee et al. | |
| 2012/0236422 A1* | 9/2012 | Sue | G02B 7/02 359/813 |

\* cited by examiner

LENS DRIVING DEVICE

BACKGROUND OF THE INVENTION

1. Field of the Invention

The present invention relates to a lens driving device of a mobile phone or a tablet terminal loaded with a camera, in particular to a lens driving device for elastically supporting a lens support for retaining a lens (exactly, a lens assembly integrated more than one lens).

2. Description of Related Art

In recent years, a camera unit loaded in a mobile phone or a tablet terminal is high in pixelate, and is also nearly loaded with an automatic focusing function. As a driving manner of a lens system loaded with the automatic focusing function, the lens driving device using a voice coil motor with simple structure is widely adopted.

The lens driving device using the voice coil motor is provided with the lens support for retaining the lens in the central part. The lens driving device is of the following structure, namely an internal thread part for being screwed with an external thread (generally a right thread) on the side of the lens is formed on the inner circumference side of the lens support, and an initial setting focusing position can be simply adjusted by adjusting the lens to the preset focusing positions.

Referring to FIG. 12 to FIG. 18 appropriately, an existing lens driving device is described.

As shown in FIG. 16, as an ordinary automatic focusing camera unit assembled with the lens driving device 10 using the voice coil motor, after an image sensor unit 30 having electronic devices (not shown) such as a driving IC (Integrated Circuit) or optical components such as an IR (Infrared Radiation) filter 32 is mounted on the lower side of the lens driving device 10, the lens 20 are screwed and inserted from the upper side of the lens driving device 10 in the lens support 3 and is adjusted to the preset focusing position (an infinitely great position or more press-in position than an infinitely great position), and the lens 20 are temporarily fixed with the lens support 3.

Then, focusing actions are carried out actually, if no abnormal problems appear on the pictures presenting views in the far-distance side (upper side direction in the figure), the lens 20 are sufficiently fixed on the lens support 3 by using an adhesive.

As shown in FIG. 12 to FIG. 14, in the ordinary lens driving device 10, in order to control the damage caused when the lens 20 are screwed to the minimum limit, the contour part 7d and contour part 2d of an upper spring 7 and a lower spring 2 and arm parts 7f, 2f which are used for connecting an inner contour part 7e with an inner contour part 2e and take the springs to play functions are disposed in an extending direction when rotating along the clockwise direction. Because under the condition of being opposite to the extending direction, the direction becomes a buckling direction when the lens 20 are screwed, and the lens are easily damaged.

A plurality of bending parts 9a are arranged on the magnet yoke 9 so as to be taken as clamping mechanisms for limiting the amounts of movement in the vertical direction. The bending parts 9a are disposed between the outer wall 3e of the thread part 3c of the lens support 3 and the inner circumference surface of the coil 4 so as to play a role of a reverse magnet yoke in improving the magnetic circuit efficiency. The clamping parts 9c of the bending parts 9a and the clamping parts 3f arranged at the mounting positions on the lower side of the coil 4, namely on the inner side of the coil 4, are oppositely arranged so as to limit the maximum amount of movement of the lens 20.

The clamping parts 9c of the magnet yoke 9 and the clamping parts 3f of the lens support 3 are spaced at intervals C when the lens support 3 does not move, the clamping parts 9c of the magnet yoke 9 abut against the clamping parts 3f of the lens support 3 during driving, and thus the state that the interval C is zero is formed, so as to prevent the lens to be moved beyond the limit, and make sure the adjustment of the focusing position is carried out in the range of the interval C.

Moreover, the lens driving device 10 using the voice coil motor is such configured that the lens 20 goes up and down by means of the arms 7f of the upper spring 7 and the lower spring 2 when the lens 20 are driven, the lens 20 are not in contact with other components, and thus the magnetic retardation can be controlled in the minimum extent.

The structure has already been disclosed by Patent Document 1: JP 2012-88434 and Patent Document 2: JP 4966750.

As mentioned above, a plurality of movable components move up and down only by means of the arms 7f of the upper spring 7 and the lower spring 2 but are not in contact with each other, and thus under the condition that the lens 20 are screwed in the thread part 3c of the lens support 3 of the lens driving device 10, the upper spring 7 and the lower spring 2 generate stress in the extending direction when being subjected to a torque effect. Therefore, when the lens 20 are screwed in the thread part 3c, force below 60 gfcm (gramforce centimeter) (about 0.6 cNm) without damaging the upper spring 7 and the lower spring 2 is needed for twisting.

Moreover, recently, relative to a lens driving device 10, the combined application of various lens 20 with different heights or pixel counts taken as a camera assembly is being developed. However, in the range that the upper spring 7 and the lower spring 2 are not damaged and under the low torque (generally about 20-60 gfcm) without loosening during assembling, all combinations of the various lens 20 which are used for forming the external threads and are called mold number of lens barrel parts and used for forming the mold number of the lens support 3 of the internal thread are difficult to specify. Therefore, the clamping mechanism in the rotating direction is used so as to limit the amount of movement of the lens in the rotating direction, so that the upper spring 7 and the lower spring 2 are unlikely to be damaged under the effect of the torque (generally about 100-150 gfcm) that the thread is not damaged.

For example, as shown in FIG. 14, for the purpose that the amount of components is not added and the amount of movement of the lens in the rotating direction (clamping mechanism in the rotating direction) can be limited, the existing side face part 9b for limiting the bending part 9a on the inner side of the magnet yoke 9 in the vertical direction and the positioning guiding part 3b of the coil 4 of the lens support 3 extend towards the side (face) of the bending part 9a respectively, so that the rotating clamping parts 3d are spaced at intervals F on the side faces and on the two sides along the clockwise direction or counterclockwise direction. The side face parts 9b of the bending part 9a on the inner side of the magnet yoke 9 abut against the rotating clamping parts 3d of the lens support 3, and thus the distance between the side face parts 9b of the bending part 9a on the inner side of the magnet yoke 9 and the rotating clamping parts 3d of the lens support 3 is limited to be the interval F, so that the upper spring 7 and the lower spring 2 are not deformed slightly even if stretching or buckling under the effect of the rotation torque generated when the lens 20 are adjusted to be screwed at the focusing positions.

However, in the lens 20 of a generally used mold product, the lens are manufactured by halving the thread part as a half (at 180-degree intervals) structurally, sometimes the thread position divided in a shaping state is slightly offset, or the center shafts are offset, or the torque during assembling exceeds the specification (called as abnormal torques as follows). As shown in FIG. 13, the bending part 9a of the magnet yoke 9 as the clamping mechanism in the rotating direction is located closer to the lower side than the mounting surface 3h of the inner contour part 7a of the upper spring 7, and enters in the middle of the upper-and-lower position of the coil 4. Therefore, under the condition that the rotating clamping parts 3d or side face parts 9b are damaged by sinking or cutting under the effect of abnormal torque, the problem is unlikely to be observed on the opening side (inserting direction of the lens 20 in the figure, namely the direction of the side of the object to be shot).

That is to say, when the rotating clamping parts 3d are damaged by sinking, the condition that the interval F is exceeded appears. Under this condition, the upper spring 7 and the lower spring 2 are also damaged to cause the problem that the characteristics of the lens 20 are worsened or cause the problem that the reliability is reduced after the lens is in the market.

Therefore, in order to prevent the abnormal torque from causing that the characteristic is reduced or the reliability is reduced on the basis that the existing structure is not changed, high-priced upper spring 7 and lower spring 2 with higher twisting force and high allowable stress need to be used in order to improve the rigidity of the upper spring 7 and the lower spring 2.

Moreover, under the condition of image failure caused by initial failure of an optical system inside the lens 20, the image sensor units 30 having the driving IC are partially expensive, and thus partial failures of the image sensor units 30 cannot be processed, only a damaged lens 20 is removed from the lens support 3 of the lens driving device 10 generally, and then another lens for replacing is assembled again.

Particularly when the lens 20 is removed, for the purpose that the lens 20 is rotated in the lifting (floating in the side of the object to be shot) direction (counterclockwise direction) during being disassembled, the center shaft of the external thread part of the lens 20 and the center shaft of the internal thread part of the lens support 3 are offset, and the lens support 3 is tilt, so that the connected upper spring 7 and lower spring 2 are easily damaged under the effect of force subjected in the buckling direction.

Therefore, in the assembling process of the camera assembly, when the lens 20 is inserted, or under the condition that the lens 20 is removed when the lens 20 is repaired, the help of the clamping mechanism in the rotating direction arranged in the lens driving device 10 is needed; moreover, for the purpose that the upper spring 7 and the lower spring 2 or internal components are not damaged, the rotating clamping parts 3d are arranged on the lens support 3 generally, and the lens 20 is retained by utilizing a fixed clamp embedded with the rotating clamping part 3d.

For example, as shown in FIG. 15, groove-shaped clamping parts 3r are arranged at the rotating clamping parts 11c of a rotation limiting clamp 11 for fixing of the existing lens support 3 between the upper part of the thread part 3c of the lens support 3 and the lower side of the mounting surface 3h of the inner contour part 7e of the spring 7. The rotation limiting clamp 11 includes an opening part 11a inserted with the lens 20, a guiding part 11b for guiding the shape of the lens driving device 10, namely the shape of the magnet yoke 9, and rotating clamping parts 11c embedded with the clamping parts 3r of the lens support 3.

The widths of the rotating clamping parts 11c are formed to be equal to or slightly smaller than the widths of the clamping parts 3r of the lens support 3, the amount of the rotatable movement is far smaller than the interval F of the clamping mechanism in the rotating direction, and the embedding is carried out in the state that the lens is hardly loosened.

Under the condition that the lens 20 is assembled, the guiding part 11b of the rotation limiting clamp 11 is aligned to the shape of the magnet yoke 9, the rotation limiting clamp 11 is mounted on the upper surface of the magnet yoke 9, the clamping parts 3r of the lens support 3 are embedded with the rotating clamping parts 11c, and the state that the lens support 3 is approximately fixed relative to the magnet yoke 9 (lens driving device 10) is formed. The lens 20 is inserted from the opening part 11a of the rotation limiting clamp 11 and screwed for adjusting through the above state, so that the rotating clamping parts 11c of the rotation limiting clamp 11 or the upper spring 7 and the lower spring 2 cannot be damaged under the effect of the abnormal torque, and the lens 20 can be disassembled safely when the lens is screwed for adjusting or the damaged lens 20. Generally, two to four pairs of clamping parts 11c of the rotation limiting clamp 11 and two to four pairs of clamping pars of the lens support 3 are arranged. Moreover, in order to prevent the shaft from being offset when the lens 20 are inserted, preferably more than three pairs of lens are arranged.

However, the rotation limiting clamp 11 is usually made of metals (such as aluminum and the like) with durability, the clamping parts 3r of the lens support 3 made of resin and the rotating clamping parts 11c are not in contact with each other and are difficult to embed when the lens driving device 10 is mounted. Therefore, under the condition that the clamping parts 3r and the rotating clamping parts 11c are worn, the surfaces of the clamping parts 3r may fall down sometimes to generate micro garbage (about 20 microns).

Under the condition of determining the micro garbage generated by the clamping parts 3r partially before leaving the factory, in order to prevent the reliability from being reduced, the micro garbage can be removed, or the adhesive for fixing is used for being fixed with the lens 20 together so as to prevent the garbage from entering the inside or being attached onto other components. However, under the condition that the damaged lens 20 is discovered through image inspection, the lens 20 needs to be replaced, and the lens 20 is removed from the lens driving device 10. When the lens 20 is removed from the lens driving device 10, the micro garbage may come to the side of the thread part 3c, the removed lens 20 is pulled to fall down inside the device and fall on the IR filter 32 or the image sensor 31, or when the replaced new lens 20 is inserted, the micro garbage falls in the device and remains on the IR filter 32 or the image sensor 31, and the condition of defective pixels appears.

Particularly, in recent years, narrow pixel interval of the image sensor 31 is caused by high pixelate, and the micro garbage is also easily attached onto the IR filter 32 or the image to cause defective or abnormal pixels.

The micro garbage attached onto the upper surface of the IR filter 32 or the image sensor 31 may move along with cleaning before leaving the factory sometimes, but the sensor unit 30 is assembled on the lower side of the lens driving device 10 without a gap, and the micro garbage usually remains inside the device. Therefore, after the product is in the market for popularization, the micro garbage may possibly be attached to a light path to cause defective pixels.

Under the condition that the micro garbage is generated, adhesive property needs to be utilized for removing the garbage for additional work, if the micro garbage falls to be closer to the lower side than the thread part 3c due to operation error, or under the condition that the micro garbage enters the inside of the image sensor unit 30, the garbage cannot be removed, and the expensive camera assembly is taken as an inferior-quality product for treatment, so that the rate of finished products is reduced.

Moreover, recently, in order to pursue high pixel and high image quality further, the boundary dimension of the lens driving device 10 needs to be unchanged, and the lens with maximum diameters (called as large-diameter lens) can also be loaded. For example, under the condition that the shape of the lens driving device 10 using the voice coil motor is 8.5*8.5, the thicknesses of the components as forming elements or the gaps among the components setting to be required minimum limit are taken into consideration, the lens 20 in M6.5 dimensions are also restricted.

As shown in section view of FIG. 17 or FIG. 18, under the condition that a circular coil 4 is used in the lens of M6.5, the bending parts 9a must enter the middle of the mounting surface 3h of the lens support 3 of the inner contour part 7a of the upper spring 7 and the arm part 7f of the upper spring 7. Therefore, under the width Wy of the existing bending part 9a, the gap between the coil 4 or the upper spring 7 and the lower spring 2 and each component needs to be reduced, so that interference among the components is easily caused, and the size of the magnet 6 or the gap between the components needs to be reduced. For the purpose that the lens 20 is converted into M6.5 from M6, the lens 20 must be reduced by 0.25 mm along the radial direction.

In order to prevent from generating interference among the components, the thickness Dc of the circular coil 4 in the radial needs to become into two layers from four layers, and thus the winding number is reduced, or the thickness Dy of the magnet yoke 9 is reduced, or the width Wy of the bending part is reduced. However, if the winding number is reduced, the total current passing through the flux is reduced, the pushing force is reduced, and thus similar characteristics do not exist, or if the thickness Dy of the magnet yoke 9 is reduced, the following failures may appear, namely the strength of the bending part 9a of the magnet yoke 9 is reduced, and the bending part 9a cannot serve as the clamping mechanism in the rotating direction to take effect.

Therefore, as shown in Patent Document 1, as a method in other rotating directions which is restricted by using the large-diameter lens (clamping mechanism in the rotating direction), the coil 4 formed in an octagonal shape is used. Or, if as shown in Patent Document 2, the magnet yoke 9 adopts an unbending structure.

The thickness of the clamping mechanism in the rotating direction of each component as shown in each patent document needs to be thinned and restricted to be minimum limit permitted by the large-diameter lens, under the condition that abnormal torque is applied to the rotating clamping part 3d or the rotating clamping part 11c, some rotating clamping parts 3d on the resin part side may be cracked, worn or deformed to cause damage or micro garbage. If the damage or micro garbage is generated, the durability of the rotating clamping parts 3d can be reduced, some problems may appear after the product is in the market, namely the rotating clamping parts 3d can also be damaged even if under the conditions more relaxed than ordinary conditions, or the load exceeding allowable stress is applied to the upper spring 7 and the lower spring 2 to cause that the characteristics of the lens driving device 10 are worsened, or the damaged micro garbage is scattered everywhere to cause failure influence on the hysteresis characteristic during moving.

In the structure as shown in Patent Document 1, the bending part 9a of the magnet yoke 9 serves as a back yoke, and thus the bending part 9a enters the position near the middle of the coil 4, and whether the lens is damaged or not is unlikely to be discovered from the opening side of the lens 20. In the structure as shown in Patent Document 2, the rotating clamping part 3d is positioned on the lower side of the coil 4, and thus whether the lens is damaged or not is unlikely to be discovered from the opening part 11b of the lens 20 outside.

Therefore, in the existing rotation limiting method as shown in mentioned above, under the condition that the lens 20 is removed as the lens 20 is damaged or the abnormal rotating torque is applied due to impact, the clamping mechanism in the rotating direction is located near the middle (inner side) of the coil 4 or closer to the lower side than the coil 4, and thus each part is damaged by restricted rotation cannot be definitely confirmed from the opening part 11a. Moreover, under the condition that micro damage is caused, the parts cannot be confirmed to leave the factory directly, and it is predicted that troubles may appear after the parts are delivered to the destination (mobile terminal assembling destination) or the market.

Therefore, in the existing lens driving device 10, the upper spring 7 and the lower spring 2 may be deformed when being subjected to the torque (in the range of about 200-300 gfcm) greater than the existing torque, or the rotating clamping parts 3d, 11c serving as the clamping mechanisms in the rotating direction may be damaged. When the lens 20 is mounted or removed, in case of the condition that the rotating clamping parts 3d, 11c as the clamping mechanisms in the rotating direction are worn, shrunken or damaged or cause micro garbage, the damage or fragments can not be confirmed easily, and inferior-quality products can not be assigned reliably.

BRIEF SUMMARY OF THE INVENTION

In order to solve the problem, the present invention aims to provide a lens driving device. A state that the lens driving device is damaged can be confirmed easily.

The lens driving device of the present invention includes a lens support for retaining a lens by taking the side of a object to be shot as the upper part of the direction of an optical axis, a coil which is disposed on the outer circumference side of the lens support and enables the lens support to move in the direction of the optical axis, a fixing assembly disposed on the upper side of the lens support, springs which are used for connecting the lens support with the fixing assembly and support the lens support to be capable of swinging in the direction of the optical axis, an opening part permitting the lens to insert in the central side and a magnet yoke disposed on the peripheral side of the fixing assembly. The lens driving device is such disposed that extruding clamping parts closer to the upper side than a mounting surface for one of the springs to mount are arranged on the lens support, the magnet yoke is provided with bending parts extruding from the edge part of the opening part to the lower side, and the bending parts of the magnet yoke are located closer to the upper side than the mounting surface of the lens support.

According to the lens driving device of the present invention, whether the clamping mechanisms are damaged can be more easily observed when the lens is disassembled from the opening part of the magnet yoke. Moreover, the shape of the coil can be circular, and can also be quadrangular or octagonal. And then, whether the damage is caused by the abnormal torque generated when the lens is assembled and disassembled can be easily judged, so that the finished product rate and reliability of the lens driving device can be improved. Moreover, the condition that the large-diameter lens is used can also be adapted.

Moreover, as another lens driving device of the present invention, if the another lens driving device is provided with more than two clamping parts of the lens support and more than two bending parts of the magnet yoke are arranged, besides the effect generated on the basis of the above structure, the requirement of the lens driving device can also be met.

Moreover, a rotation limiting clamp used in the lens driving device of the present invention is such configured that the rotation limiting clamp includes a guiding part which has the same shape as that of the outer circumference side of the magnet yoke and is mounted corresponding to the magnet yoke, an opening part corresponding to the opening part of the magnet yoke, and rotating clamping parts extruding from the edge part of the opening part to the lower side. In the state that the guiding part is mounted on the magnet yoke, the rotating clamping parts are arranged opposite to the side faces of the clamping parts of the lens support.

According to the rotation limiting clamp of the present invention, even if under the condition that the abnormal torque is generated, the rotating clamping part is only in contact with the clamping part, and thus the rotating clamping part used with normal actions cannot be damaged.

Moreover, as another rotation limiting clamp of the present invention, if the structure that more than two rotating clamping parts of the rotation limiting clamp are arranged exists, besides the effect generated on the basis of the above structure, the requirement of the lens driving device can also be met.

Moreover, the summary of the invention does not list all features required by the present invention, and auxiliary combination of these features can also become the present invention.

BRIEF DESCRIPTION OF THE SEVERAL VIEWS OF THE DRAWING(S)

The foregoing and other exemplary purposes, aspects and advantages of the present invention will be better understood in principle form the following detailed description of one or more exemplary embodiments of the invention with reference to the drawings, in which.

Figure 17:
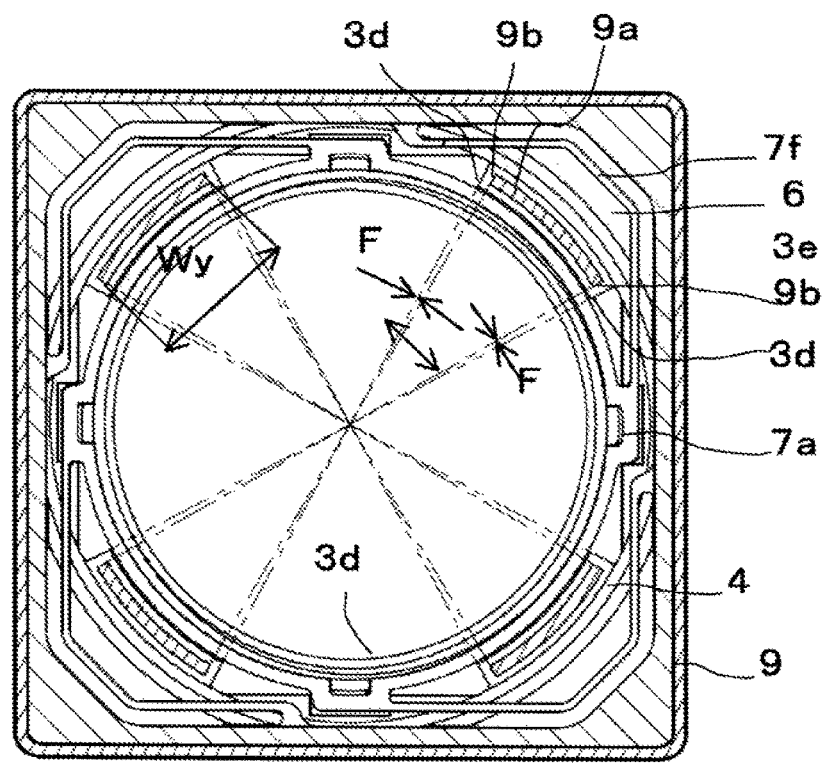
Figure 18:
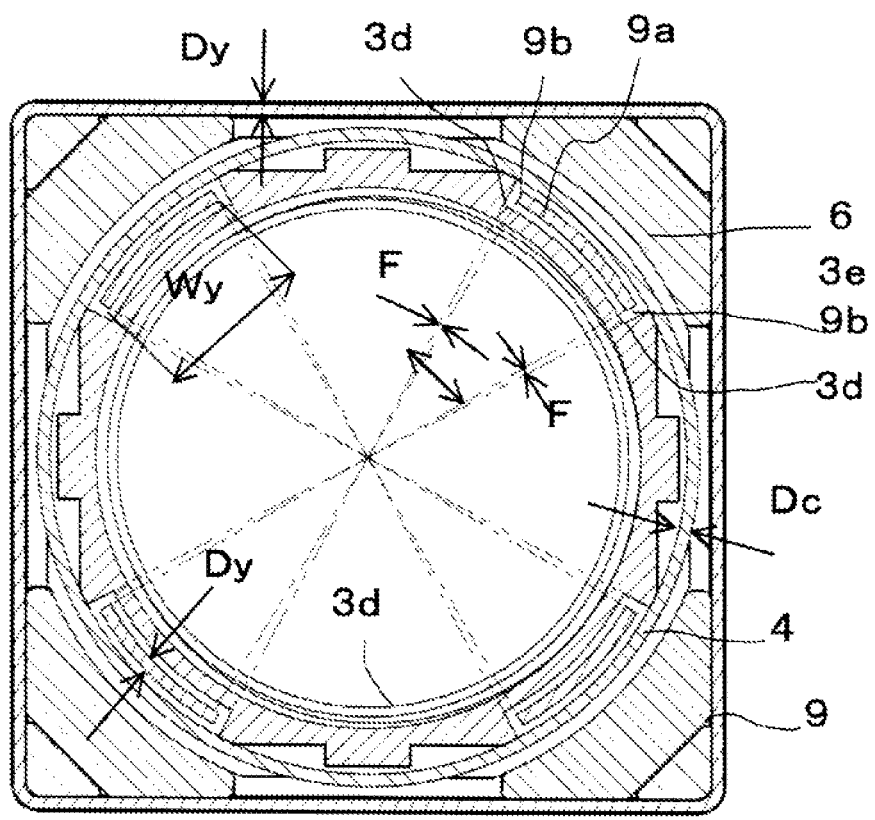

FIG. 17 is a cross section view of the existing lens driving device corresponding to a large-diameter lens using a circular coil, cutting along the position closer to an upper part than the upper spring; and FIG. 18 is a cross section view, of the existing lens driving device corresponding to the large-diameter lens using the circular coil, cutting along the position closer to a lower part than the upper spring.

DETAILED DESCRIPTION OF THE INVENTION

The invention will now be described in detail through several embodiments with reference to the accompanying drawings.

Referring to FIG. 1 to FIG. 11 below appropriately, the present invention is described.

Figure 1:
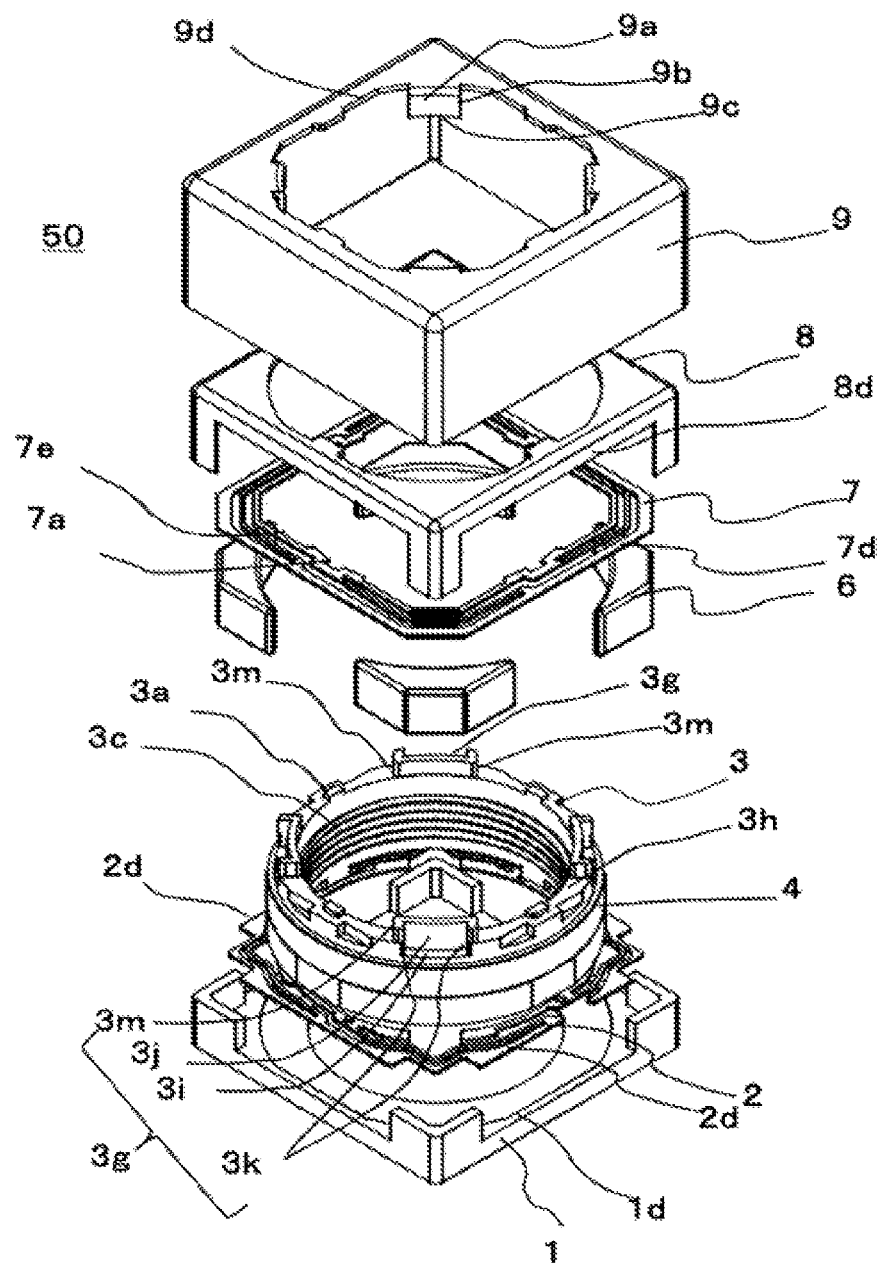
FIG. 1 is an exploded view (condition of using a circular coil) of a lens driving device according to a first embodiment of the present invention.

FIG. 1 is an exploded view illustrating a lens driving device 50 of the present invention. In addition, in the specification, the side of the object to be shot is taken as an upper side of the direction of the Z axis (optical axis of the lens), and two directions orthogonal to the Z axis are respectively taken as the direction of the X axis and the direction of the Y axis.

Figure 10:
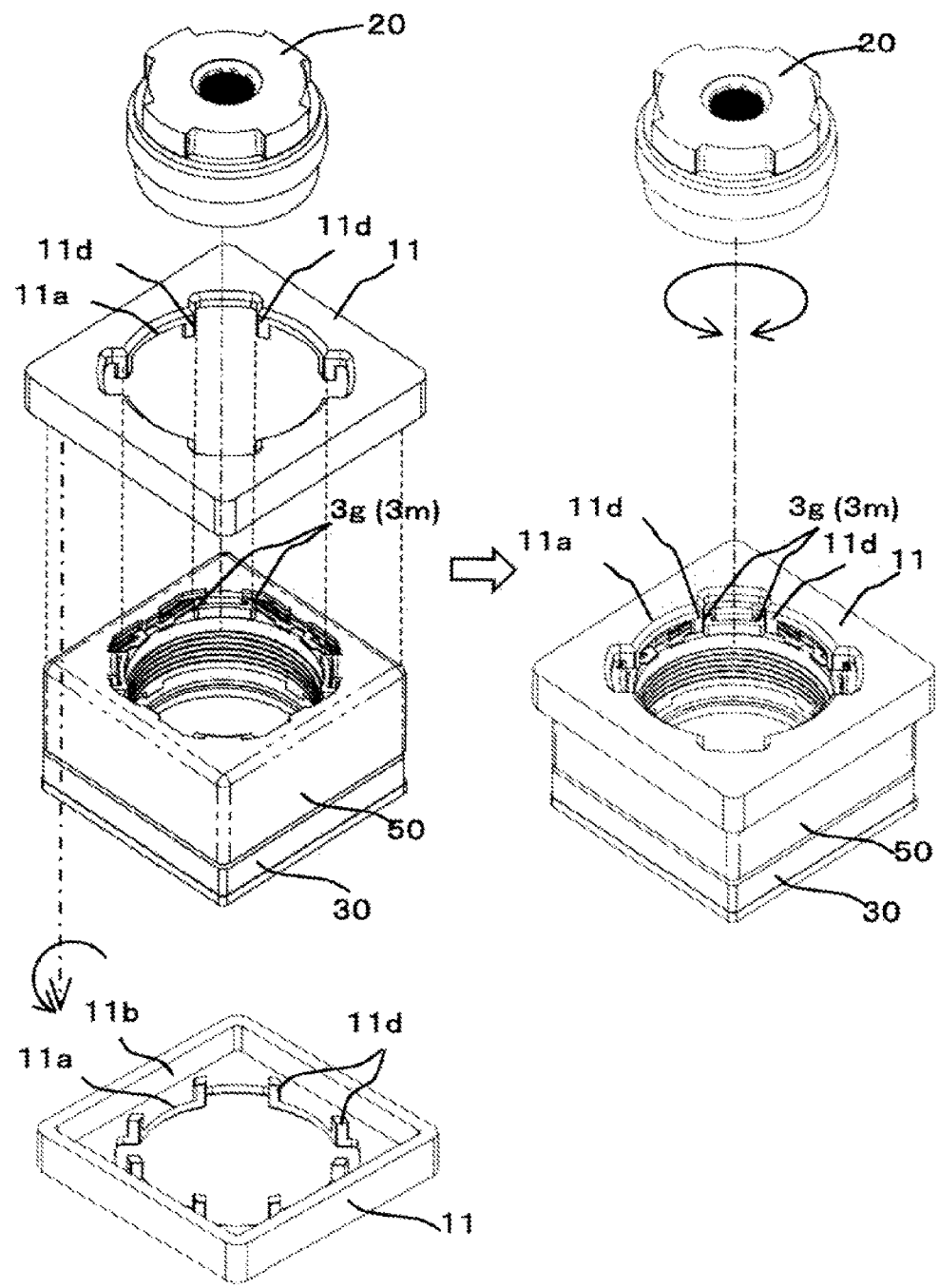
FIG. 10 is a schematic diagram showing that a rotation limiting clamp when assembly or disassembling a lens according to the first embodiment of the present invention.

The lens driving device 50 includes a lens support 3 formed with a thread part 3c for retaining a lens 20 as shown in FIG. 10, a coil 4 mounted on an outer circumference side of the lens support 3 and is used for enabling the lens support 3 to move up and down in the direction of the optical axis, a lower side fixing component 1 disposed on the outer side (lower part of the outer circumference side) of the lens support 3, an upper side fixing component 8 disposed on the outer side (upper part of the outer circumference side) of the lens support 3, a lower spring 2 which is used for connecting the lens support 3 with the lower side fixing component 1 at an opposite side (lower side) of the side of the object to be shot (opening part side) of the lens 20 and supporting the lens support 3 to be capable of swinging in the direction of the optical axis, an upper spring 7 which is used for connecting the lens support 3 with the upper side fixing component 8 from the side of the object to be shot (opening part side, namely the upper side of the lens 20) and supporting the lens support 3 to be capable of swinging in the direction of the optical axis, a square magnet yoke 9 which is mounted around the lens support 3 and is made of a magnetic body such as soft iron so as to form an outer side metal over, and a plurality of magnets 6 which are mounted on the magnet yoke 9. The outer circumference shapes of the magnets 6 are formed to be the shape corresponding to the inner wall of the magnet yoke 9, and the inner circumference shapes of the magnets 6 are formed to be the shape corresponding to the outer circumference of the coil 4.

The magnet yoke 9 defines an opening part 9d for the lens to insert in the middle, and is arranged on the outer circumference side of the upper side fixing component 8 and the lower side fixing component 1. A plurality of bending parts 9a are formed on the magnet yoke 9, the bending parts 9a are arranged near the four corners of the lens driving device 50, and the bending parts 9a are dropped down from the edge of the opening part 9d downwards. Each bending part 9a includes two side face parts 9b and a lower end part 9c connecting the bottom ends of the two side face parts 9b. In more detail, each bending part 9a is substantially rectangle, its two side surfaces are the two side face parts 9b, and its bottom side surface connecting the two side surface is the lower end part 9c. On the other hand, the clamping parts 3g of the lens support 3 are located near the four corners of the lens driving device 50, and are protruded from the mounting surface 3h of the lens support 3 to the upper side. Moreover, the bending parts 9a are located closer to the upper side than the mounting surface 3h of the lens support 3. Namely, the length of the bending parts 9a is designed to can not reach the mounting surface 3h of the lens support 3. Moreover, the mounting surface 3h is used for fixing the upper spring 7, it is substantially perpendicular to the optical axis, and is located upper than an upper edge of the coil 4 in the direction of the optical axis.

The shape of the contour part 2d of the lower spring 2 corresponds to the shape of a leaf spring contour retaining part 1d of the lower side fixing component 1, and is mounted on the leaf spring contour retaining part 1d of the lower side fixing component 1. The shape of the contour part 7d of the upper spring 7 corresponds to the shape of a plate spring contour retaining part 8d of the upper side fixing component 8 mounted on the magnet yoke 9, and is mounted on the leaf spring contour retaining part 1d of the upper side fixing component 8. The guiding part 7a of the upper spring 7 is clamped with the front end clamping part 3a of the lens support 3, and is used for determining the rotating direction of the lens support 3. The shape of the inner ring part 7e of the upper spring 7 is formed to correspond to the shape of the upper surface of the lens support 3.

The upper spring 7 is mounted at the upper part of the lens support 3, exactly, on the mounting surface 3h of the lens support 3, and is used for connecting the lens support 3 with the upper side fixing component 8. The upper spring 7 is used for supporting the lens support 3 to be capable of swinging in the direction of the optical axis. The lower spring 2 is mounted at the lower part of the lens support 3, and is used for connecting the lens support 3 with the lower side fixing component 2. The lower spring 2 is used for supporting the lens support 3 to be capable of swinging in the direction of the optical axis.

The coil 4 is disposed on the outer side of the lens support 3 in the radial direction, namely closer to the inner side of the radial direction than the magnets 6, and is disposed in a magnetic field in radial distribution generated by the magnet yoke 9 and the magnets 6. Along with the electrification to the coil 4, the coil 4 generates Lorentz force in the direction (vertical direction) of the object to be shot. The coil 4 utilizes the generated Lorentz force, so that the lens support 3 moves to a preset position balanced with restoring force of the upper spring 7 and the lower spring 2.

Four magnets 6 are disposed between the outer circumference side of the driving coil 4 and the inner circumference side of the magnet yoke 9 in the manner of surrounding the lens support 3. The inner circumference surfaces, on the side of the lens support 3, of the magnets 6 are formed to be the shape corresponding to the outside surface of the coil 4, and the outer circumference surfaces of the magnets 6 are formed to be the shape corresponding to the inner side surface of the magnet yoke 9. The magnets 6 enable the magnetic field to be generated at the interior of the magnet yoke 9.

Figure 2:
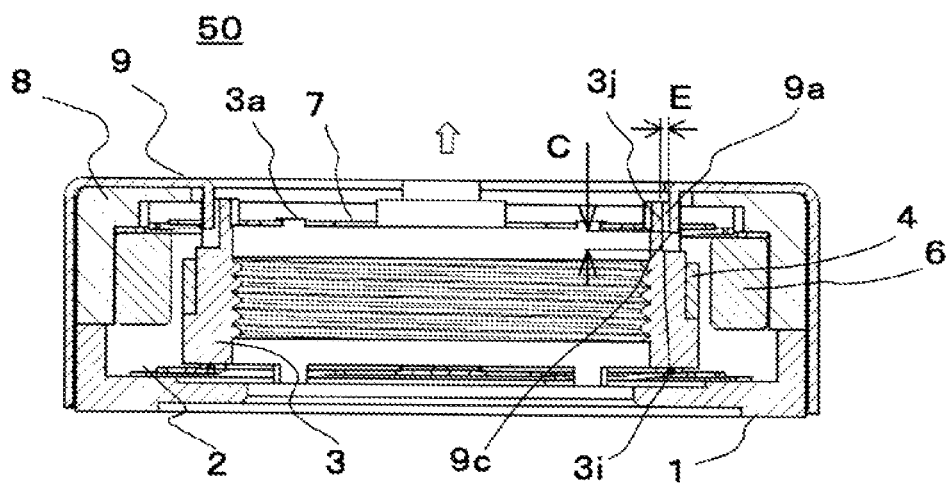
FIG. 2 is a longitudinal section view of the lens driving device having a magnet yoke with bending parts according to the first embodiment of the present invention.

As shown in FIG. 2, the lower end parts of the bending parts 9a of the magnet yoke 9 and the clamping surface 3i of the lens support serve as clamping mechanisms in the vertical direction for limiting the amount of movement in the vertical direction. The clamping surface 3i is arranged closer to the upper side than the upper surface of the coil 4 of the lens support 3. When the clamping part 3i does not act, the lower end parts 9c and the clamping parts 3i of the lens support 3 are separated from each other at an interval (maximum amount of movement) C so as to limit the interval (maximum amount of movement) C of the lens, and under the driving action of the lens driving device 50 (coil 4), the lower end parts 9c abuts against the clamping surfaces 3i after moving the interval C. That is to say, in the embodiment, the lower end face 9c of the magnet yoke 9 and the clamping part 3f of the lens support 3 are taken as clamping mechanisms for limiting the maximum amount of movement of the lens support 3 in the vertical direction (direction of the optical axis).

Figure 3:
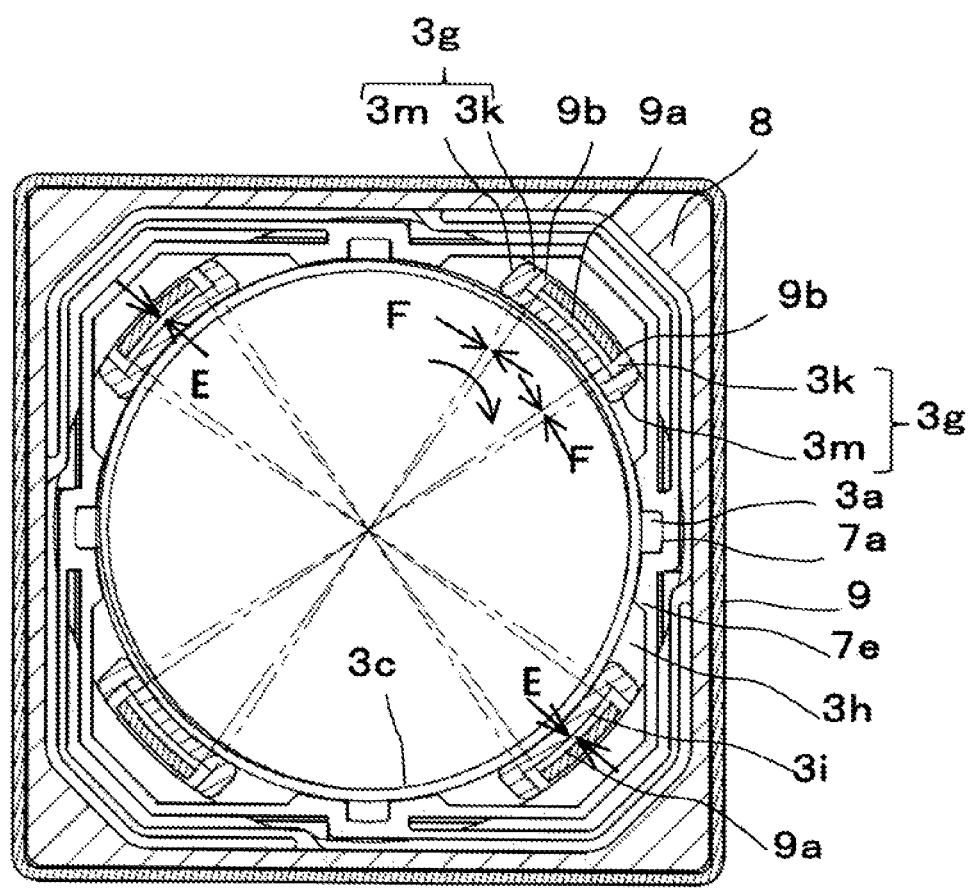
FIG. 3 is a cross section view of the lens driving device according to the first embodiment of the present invention.

As shown in FIG. 2 and FIG. 3, the inner circumference surface of the bending parts 9a of the magnet yoke 9 of the lens driving device 50 and the clamping surface 3j of the lens support 3 form clamping mechanisms in the plane/radial direction for limiting the amount of movement in the plane direction. When the lens driving device 50 (coil 4) does not act, the bending parts 9a of the magnet yoke 9 are such configured that the bending parts 9a of the magnet yoke 9 and the clamping surface 3j of the lens support 3 are separated at an interval (maximum amounts of movement) E. Relatively, along with the driving of the lens driving device 50 (coil 4), the bending parts 9a of the magnet yoke 9 move the interval (maximum amounts of movement) E to abut against the clamping surface 3j of the lens support 3 so as to reduce the damage caused by torque applying acting force to the plane direction due to falling. That is to say, in the embodiment, the bending parts 9a of the magnet yoke 9 and the clamping surface 3j of the lens support 3 are taken as clamping mechanisms for limiting the maximum amount of movement of the lens support 3 in the plane direction (direction orthogonal to the direction of the optical axis).

As shown in FIG. 3, as the rotation direction clamping mechanisms for limiting the amount of movement in the rotating direction, the side face part 9b of the magnet yoke 9 and the clamping part 3c of the lens support 3 are used for limiting the maximum amount of movement along the plane direction. When the lens driving device 50 (coil 4) does not act, the bending parts 9a of the magnet yoke 9 are such configured that the bending parts 9a of the magnet yoke 9 and the clamping surface 3k of the lens support 3 are separated at an interval (maximum amounts of rotation) F. Relatively, along with the driving of the lens driving device 50 (coil 4), the side face part 9b of the magnet yoke 9 abuts against the clamping surface 3k of the lens support 3 when moving the interval (maximum amount of movement) F so as to reduce the damage caused by torque applying acting force in the plane direction due to the fact that the lens 20 is screwed or the lens driving device 50 falls down. That is to say, in the embodiment, the side face part 9b of the magnet yoke 9 and the clamping part 3k of the lens support 3 are taken as the clamping mechanisms for limiting the maximum amount of movement of the lens support 3 in the rotating direction (around the direction of the optical axis).

Moreover, the lens driving device 50 includes clamping mechanism different from the existing clamping mechanism. As shown in FIG. 1 to FIG. 3, the protruding clamping part 3g protruding from the mounting surface 3h to the upper side is formed on the lens support 3. The clamping parts 3g are formed to be approximately U-shaped, and are located near the four corners of the lens driving device 50. In detail, each clamping parts 3g includes a substantially rectangle circular arc board and two side boards which all extending upwardly from the mounting surface 3h. The outside surface of the substantially rectangle circular arc board in the radial direction forms the clamping surface 3j. One side edges of the two side board are connected to the two side edges of the substantially rectangle circular arc board such that to form the U-shape, and the other side edges are at an outer side in the radial direction than the substantially rectangle circular arc board. The surfaces, facing each other, of the two side boards form the clamping surface 3k. And the surface, at the opposite side, of the two side boards form the clamping surface 3m. The clamping surface 3i is formed at the bottom of the space defined by the substantially rectangle circular arc board and the two side boards. Thus, the lower end part 9c of the magnet yoke 9 and the clamping parts 3g of the lens support 3 are arranged closer to the upper side than the upper surface of the coil 4 so as to limit the maximum amount of movement of the lens. That is to say, the lengths of the bending parts 9a are shorter than that of the existing clamping mechanism, and thus the clamping surfaces 3i, 3j, 3k are located closer to the upper part than the upper surface of the coil 4 but are not located under the shadow of the coil 4 or the bending parts 9a, so that the condition that the clamping parts 3g are in contact with the clamping part in the rotating direction is easier to be observed from the opening part 9d of the magnet yoke 9.

The clamping surface 3k has such strength that the clamping surface 3k is not damaged under the setting torque of about 100-150 gfcm. Therefore, when the lens is screwed in the thread part 3c, the lens support 3 is not deformed slightly by the stress remaining on the connected lower spring 2 and upper spring 7, and thus the lens can be safely assembled or disassembled. If the abnormal torque (such as 200 gfcm) higher than a set torque ratio is generated to cause that the clamping surface 3k is damaged, the interior condition can also be more easily to be observed from the opening part 9d of the magnet yoke 9, and thus the components can be easily replaced.

Figure 11:
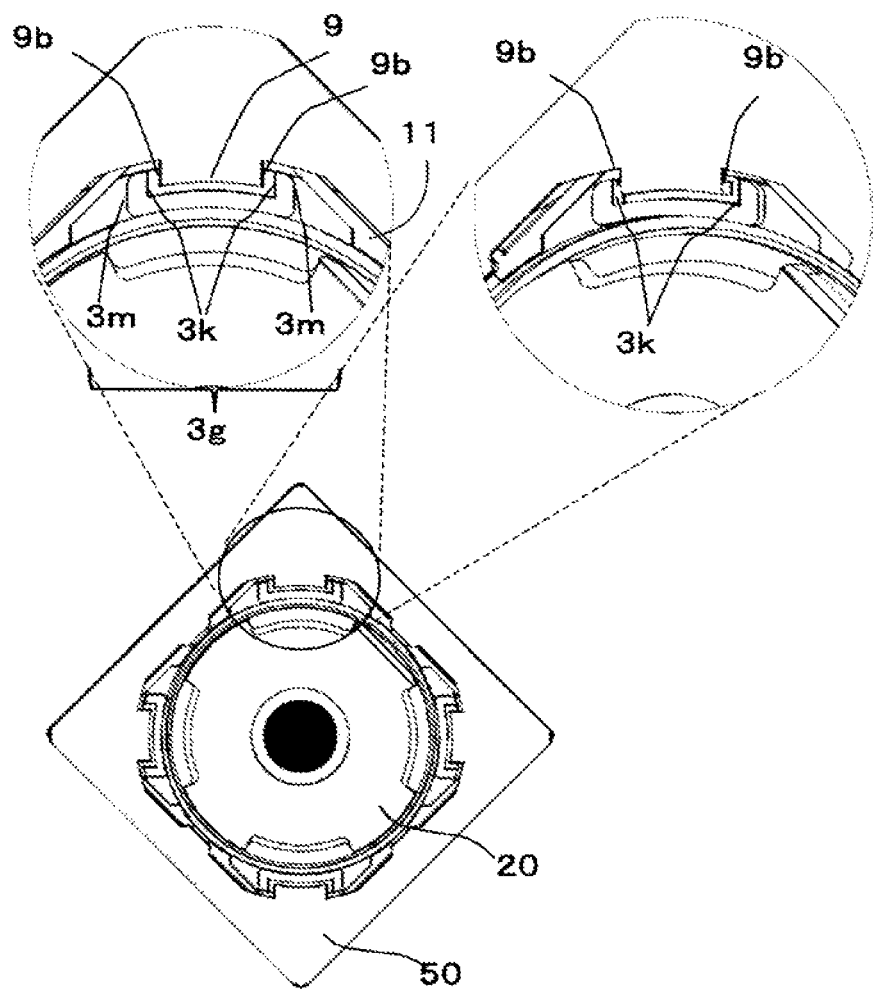
FIG. 11 shows a plane view and two partly enlarged views of the lens driving device when the rotation limiting clamp is used according to the first embodiment of the present invention.
Figure 12:
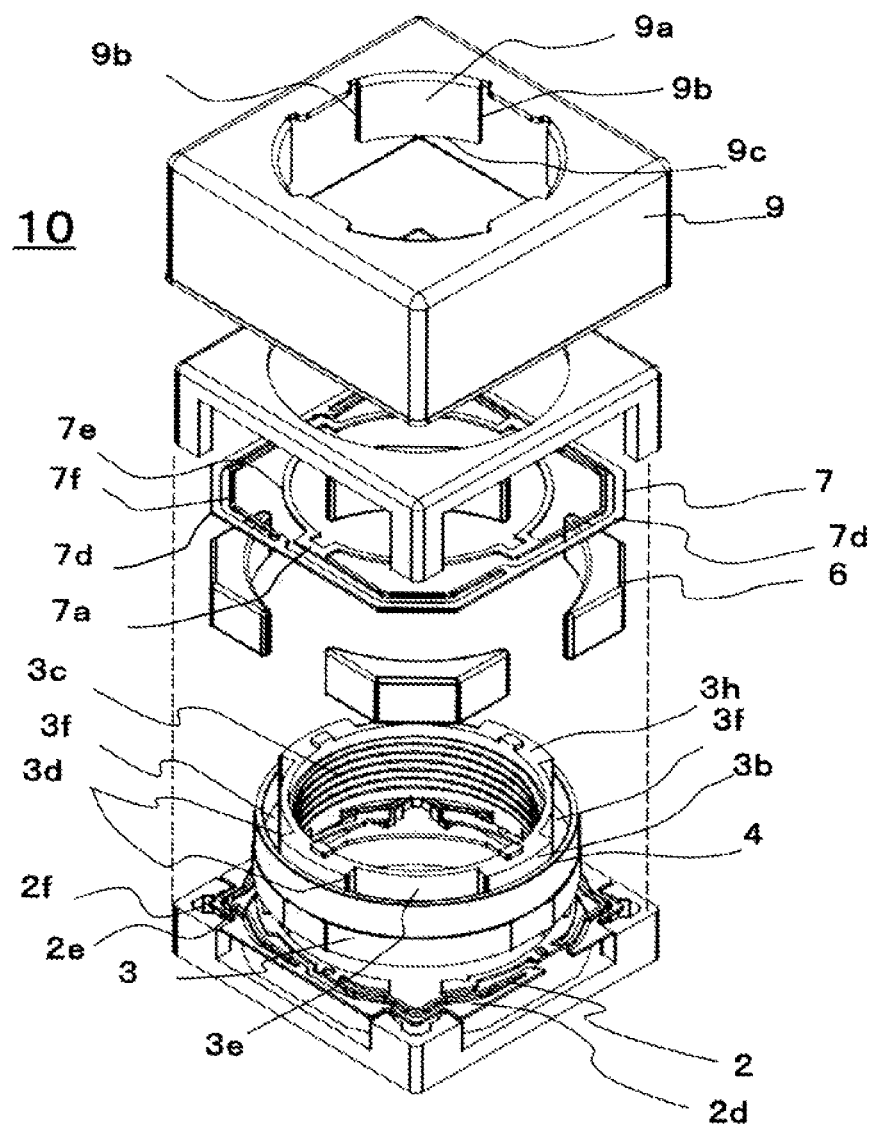
FIG. 12 is an exploded view of an existing ordinary lens driving device.
Figure 13:
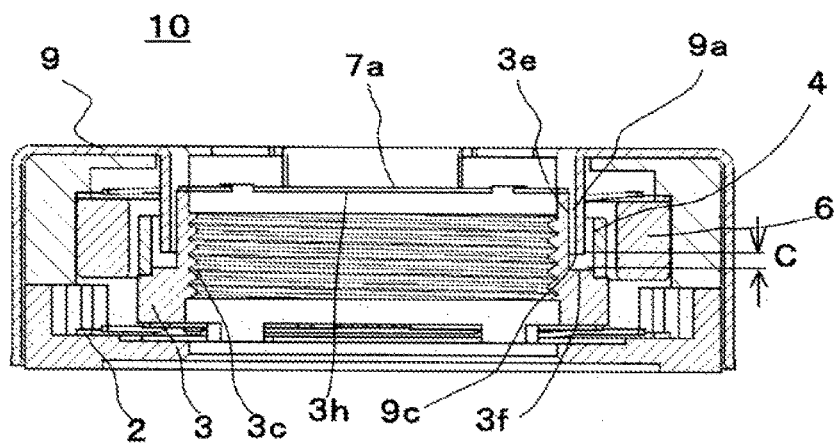
FIG. 13 is a longitudinal section view of the existing ordinary lens driving device including the bending part of the magnet yoke as shown in FIG. 12.
Figure 14:
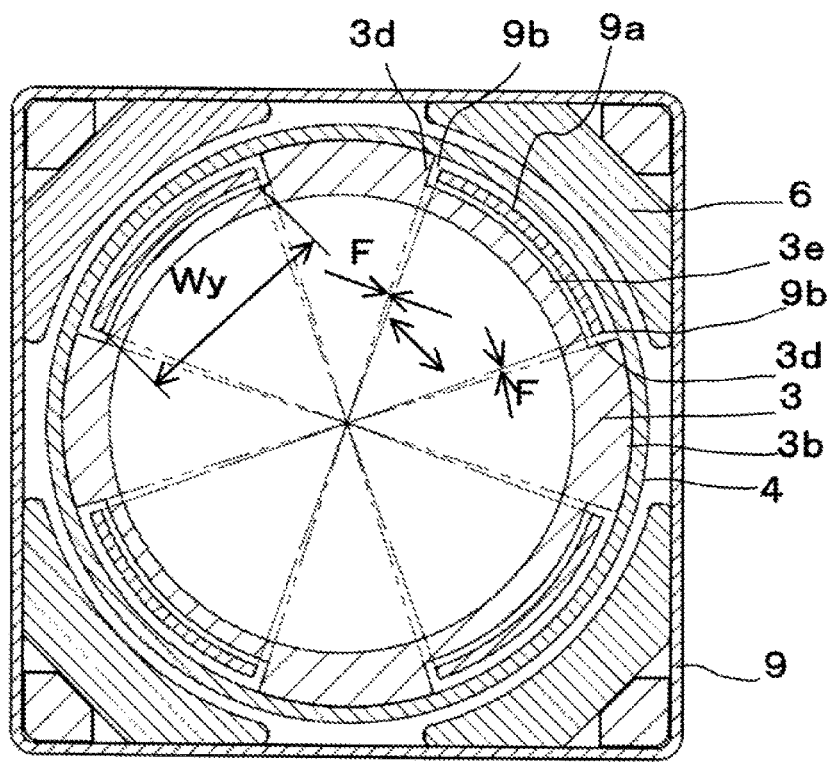
FIG. 14 is a cross section view of the existing ordinary lens driving device including the bending part of the magnet yoke as shown in FIG. 12.
Figure 15:
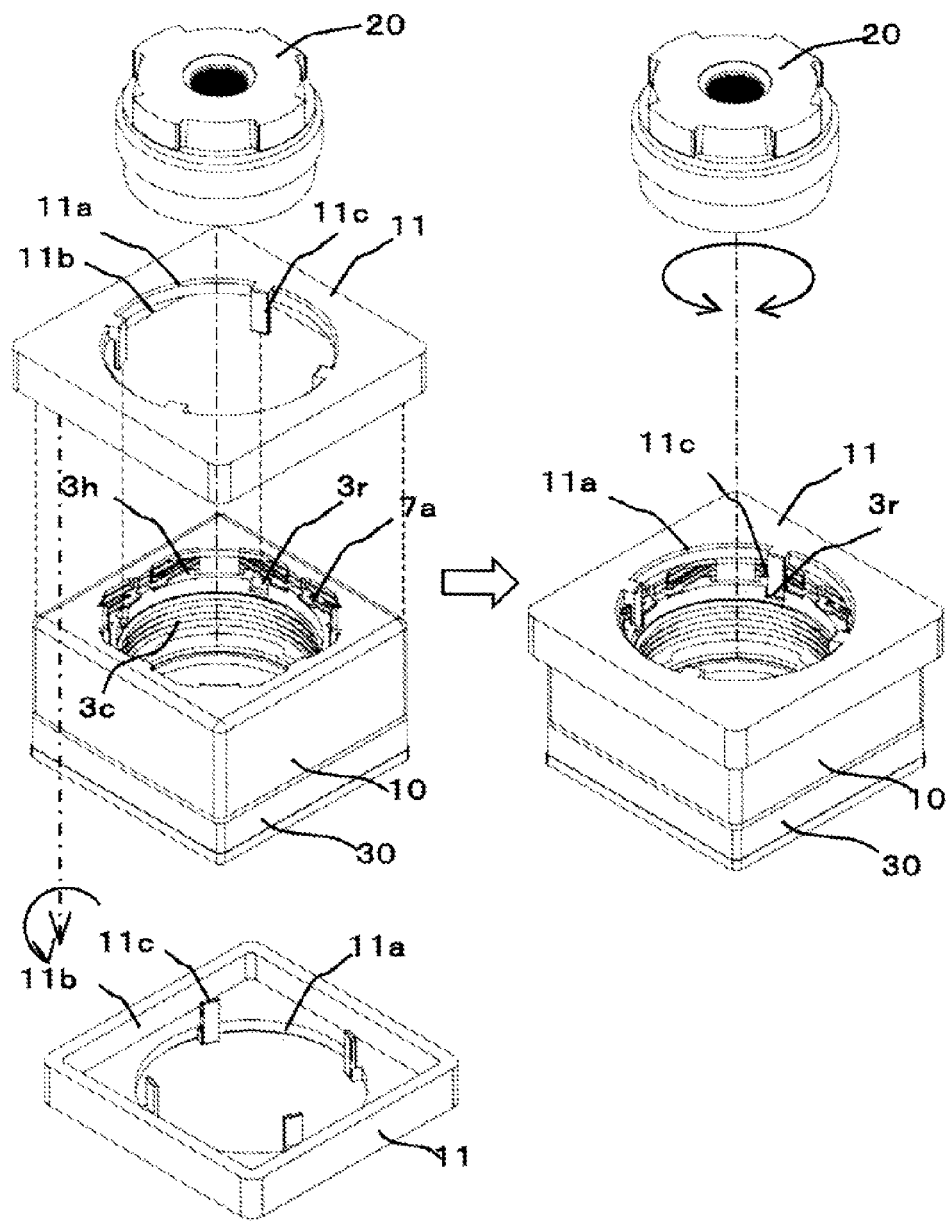
FIG. 15 is a schematic diagram showing that an existing rotation limiting clamp is used when assembly or disassembling a lens.
Figure 16:
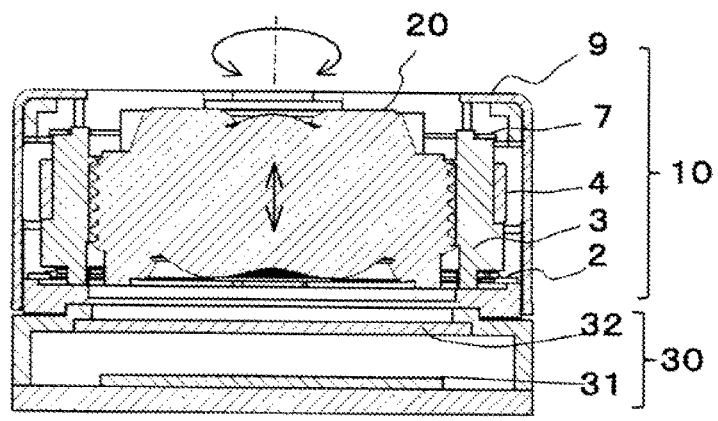
FIG. 16 is a section view of the existing lens driving device and a camera unit with a sensor unit.

FIG. 10 and FIG. 11 are diagrams illustrating rotation limiting clamps 11 for fixing the lens support 3. In the assembling process of the camera assembly, when the lens 20 is inserted (referring to FIG. 10), or under the condition that the lens 20 needs to be repaired and the lens 20 is disassembled, the help of the clamping mechanism in the rotating direction arranged in the lens driving device 10 is needed, and the rotating clamping part as mentioned above is arranged on the lens support 3, so that the upper spring 7 and the lower spring 2 or the internal components are not damaged, the lens 20 is retained by the rotation limiting clamp embedded with other rotating clamping parts sometimes.

The rotation limiting clamp 11 includes an opening part 11a used for the lens 20 to insert and with a size corresponding to the size of the opening part 9d of the magnet yoke 9, a guiding part 11b (for guiding the magnet yoke 9) and a plurality of rotating clamping parts 11d protruding from the edge part of the opening part 11a to the lower side. The guiding part 11b is formed to have a shape that is the same as the shape of the outer circumference side of the magnet yoke 9 serving as the outer shape part of the lens driving device 50 and is mounted on the magnet yoke 9 (lens driving device 50) and fixed on the magnet yoke 9.

The rotating clamping parts 11d are arranged to correspond to the positions for the clamping part 3g of the lens support to form. Moreover, in the state that the guiding part 11b is mounted on the lens driving device 50, every two adjacent rotating clamping parts 11d are arranged opposite to the two side faces (outer shape part 3m) of a corresponding clamping part 3g of the lens support 3. Namely, as shown in FIG. 11, a distance between the two adjacent rotating clamping parts 11d is set to be greater than or equal to the length between the two outer shape parts 3m of each clamping part 3. Therefore, the outer shape parts 3m of the clamping part 3g of the lens support 3 are in the state of being clamped by two adjacent rotating clamping parts 11d of the adjacent rotation limiting clamp 11.

As shown in FIG. 10 and FIG. 11, in order to prevent the clamping surface 3k from being damaged, under the condition that the rotation limiting clamp 11 is used, the rotating clamping parts 11d of the rotation limiting clamp 11 abut against the outer shape parts 3m of the clamping parts 3g of the lens support 3. At that time, by setting the interval between the rotating clamping parts 11d and the outer shape parts 3m to be smaller than the interval (maximum amount of movement) F (minimum limit), even if under the condition that the abnormal torque is generated, only the rotating clamping parts 11d are in contact with the outer shape parts 3m, so that the clamping surfaces 3k cannot be damaged.

Therefore, under the condition that the lens 20 is assembled, the guiding part 11b of the rotation limiting clamp 11 aligns to the outer shape of the magnet yoke 9 and the rotation limiting clamp 11 is mounted on the upper surface of the magnet yoke 9, and thus the state that the lens support 3 is approximately fixed relative to the magnet yoke 9 (lens driving device 10) can be formed. Moreover, the lens 20 is inserted through the opening part 11a of the rotation limiting clamp 11 in the above state and screwed for adjusting by utilizing, and thus the abnormal torque can be prevented from causing that the rotation limiting clamps 11 or the upper spring 7 and the lower spring 2 are damaged, and the lens 20 can be safely removed when the lens 20 is broken or the lens 20 can be safe when being screwed for adjusting. Moreover, the image sensor unit 30 in the figure is composed of the IR filter 32, the image sensor 31 and the like.

Moreover, the interval between the rotating clamping part 11d and the outer shape part 3m is set to be a minimum limit, and thus even if under the condition that the rotating clamping part 11d made of metals and the outer shape part 3m made of resin are worn to generate the micro garbage, the garbage can also be more easily to be observed from the opening part 9d of the magnet yoke 9 and can be removed instantly, and thus the garbage can be prevented from falling into the interior to influence the picture or the characteristics of the lens 20. Moreover, in the embodiment, the rotating clamping parts 11d of the rotation limiting clamp 11 are arranged corresponding to the amount of the clamping parts 3g of the lens support 3, but are not limited to the setting mode. It is proper that more than two rotating clamping parts 11d are arranged (a pair of adjacent rotating clamping parts 11d are set to be a group) to correspond to one clamping part 3g.

Above, according to the first embodiment, the clamping parts 3g protruding from the mounting surface 3h to the upper side are arranged on the lens support 3, and the mounting surface 3h is higher than the upper surface of the coil 4 in the direction of the optical direction, and thus under the condition that the abnormal torque is generated, the clamping surface 3k can be protected from being damaged, or the clamping surface 3k is protected from being damaged under the condition that the rotation limiting clamp 11 is used, and whether the clamping surface is damaged is easily distinguished. Therefore, it is capable of processing the micro garbage and abandon inferior-quality products, and the finished product rate and reliability can be improved.

Moreover, according to the first embodiment, the clamping parts 3g of the lens support 3 abut against the bending parts 9a of the magnet yoke 9 at the four corners of the lens driving device 50, that is, the lens support 3 abut against the magnet yoke 9 at four points, but if the durability can be guaranteed sufficiently, there can be only two or three clamping parts 3g for the lens support 3. Moreover, under the condition that the durability is insufficient, there can be more then four clamping parts 3g of the lens support 3 and more corresponding bending parts 9a accordingly.

Figure 4:
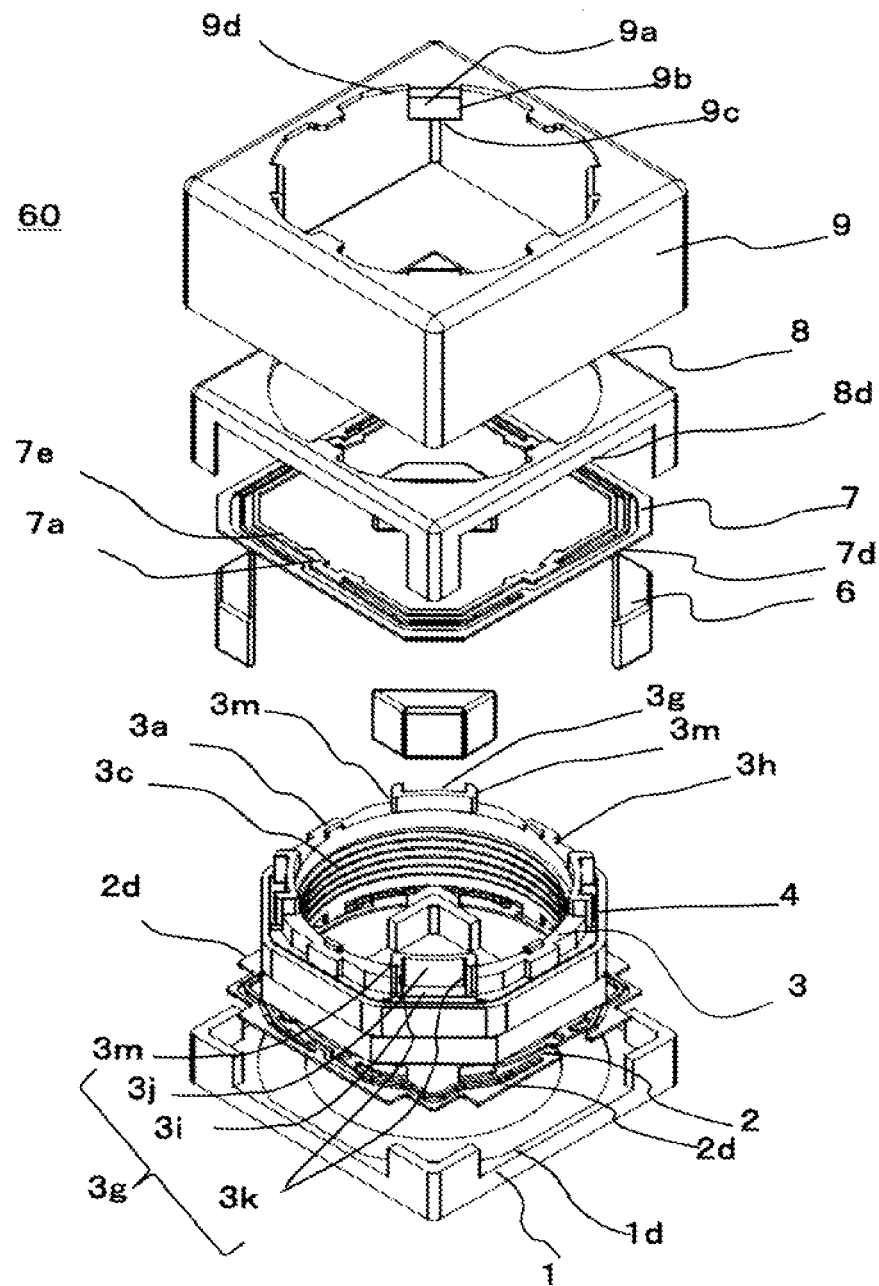
FIG. 4 is an exploded view (under the condition of using an octagonal coil) of a lens driving device according to a second embodiment of the present invention.
Figure 5:
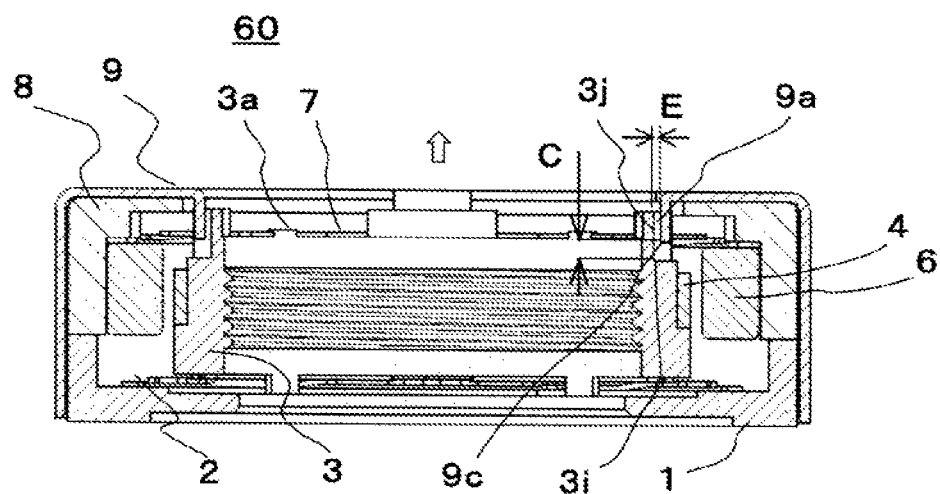
FIG. 5 is a longitudinal section view of the lens driving device having a magnet yoke with bending parts according to the second embodiment of the present invention.
Figure 6:
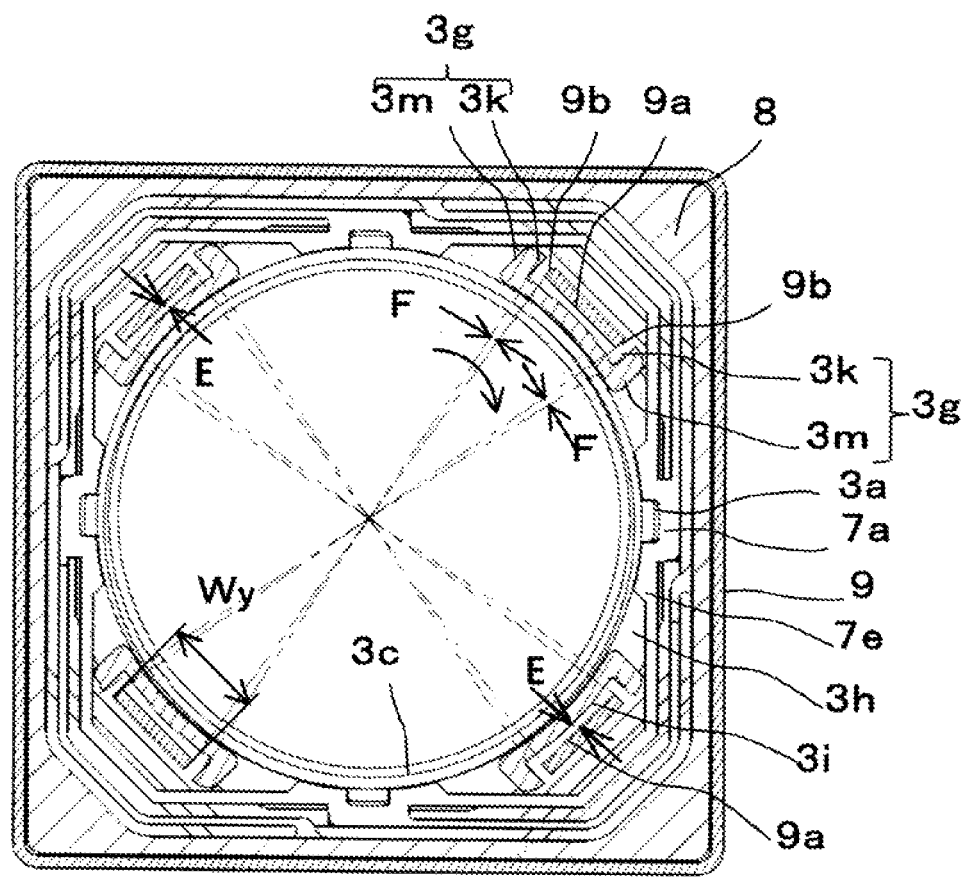
FIG. 6 is a cross section view of the lens driving device according to the second embodiment of the present invention.

FIG. 4 to FIG. 6 are diagrams illustrating the lens driving device 60 in the second embodiment of the present invention. The lens driving device 60 utilizes an octagonal coil 4 that is corresponding to a large-diameter lens.

Similar to the first embodiment, the lens driving device 60 is provided with the bending parts 9a and the clamping parts 3g as the clamping mechanisms. In the lens driving device 60, the width Wy of each bending parts 9a of the magnet yoke 9 is smaller, and thus the bending parts of the magnet yoke 9 cannot serve as reverse magnet yoke, and it is unexpected that the magnet yoke causes influences on the magnetic circuit. Therefore, the bending parts 9a of the magnet yoke 9 do not serve as the reverse magnet yoke, and the gap between the bending parts 9a and the outer side of the coil 4 in the radial direction is increased along the thickness direction of the magnet 4, so that the efficiency of the whole magnet circuit reaches to equal or higher extent. Moreover, obviously, even if under the condition that the structure equivalent to the reverse magnet yoke is not formed in the magnet yoke 9, and action can be carried out without problem.

Figure 7:
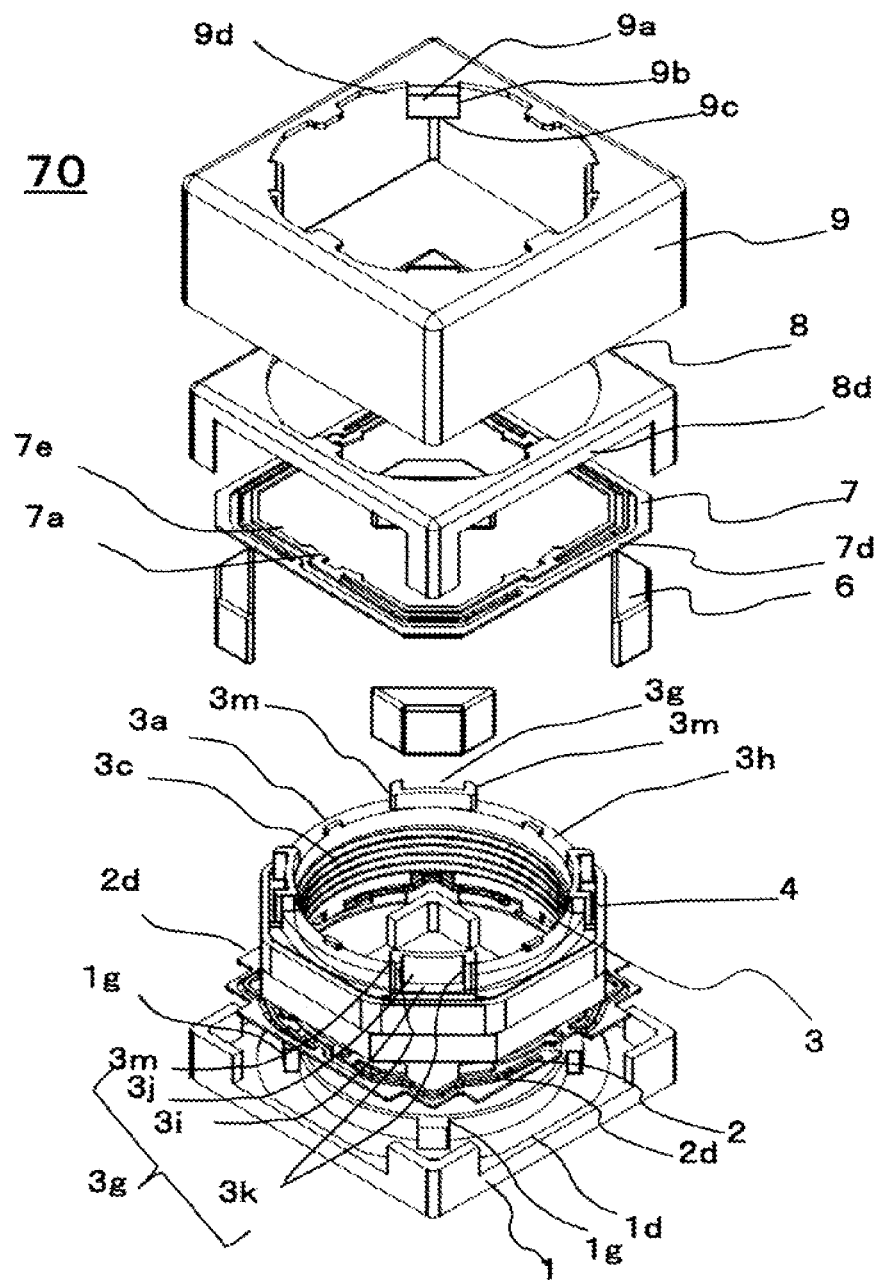
FIG. 7 is an exploded view (under the condition of using an octagonal coil) of a lens driving device according to a third embodiment of the present invention.
Figure 8:
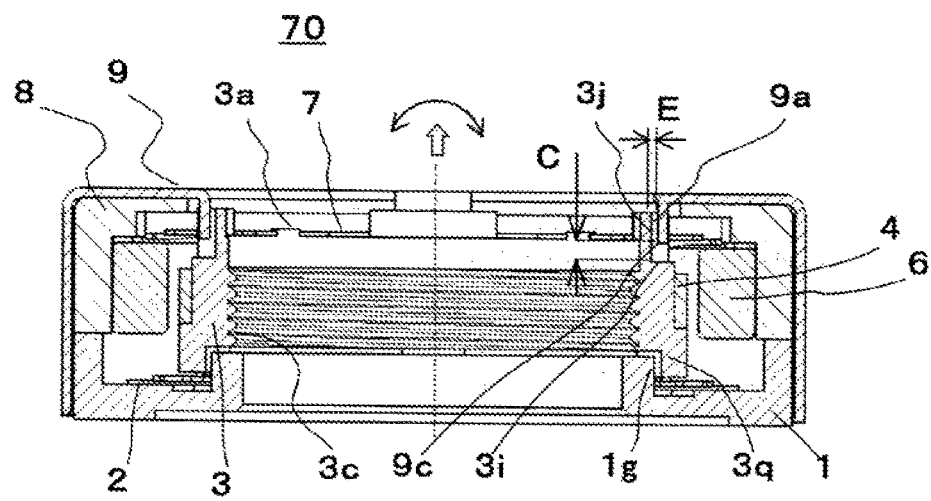
FIG. 8 is a longitudinal section view of the lens driving device having a magnet yoke with bending parts according to the third embodiment of the present invention.
Figure 9:
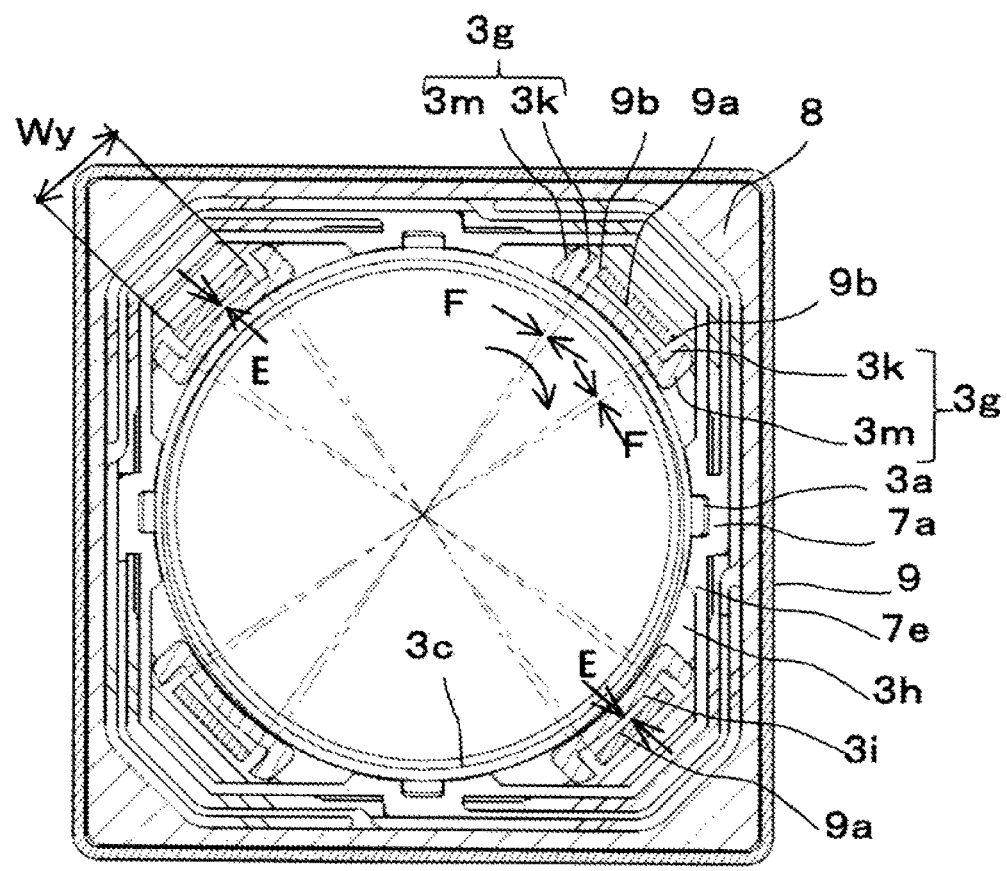
FIG. 9 is a cross section view of the lens driving device according to the third embodiment of the present invention.

FIG. 7 to FIG. 9 are diagrams illustrating the lens driving device 70 in the third embodiment of the present invention. The lens driving device 70 is such formed that several rotary limiting parts positioned on the lower side of the lens support as disclosed by JP Patent Document No. 4966750 are combined in the lens driving device 60 as shown in the second embodiment.

Specifically, the clamping parts 3g are arranged near the highest part of the lens support 3, the bending parts 9b are arranged at the topmost part of the lens driving device 70. Furthermore, the rotary limiting parts 1g and the rotary limiting parts 3q are respectively arranged, and thus the lens 20 is limited to not be tilt relative to a screw center shaft. Therefore, twisting force generated by the upper spring 7 and the lower spring 2 is reduced, the endurance for the abnormal torque is improved, and the finished product rate and reliability can be improved further. Moreover, uncleaned micro garbage is unlikely to intrude into the interior of the sensor unit 30, and thus the reliability can be improved further.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A lens driving device, comprising:
a lens support for retaining a lens, an object to be shot being taken as an upper side of a direction of an optical axis of the lens;
a coil configured on an outer circumference side of the lens support and configured for moving the lens support in the direction of the optical axis;
an upper side fixing component disposed on an upper side of the lens support;
an upper spring configured for connecting the lens support with the upper side fixing component at an upper portion of the lens support and supporting the lens support to be capable of moving in the direction of the optical axis; and
a magnet yoke disposed on an outer circumference side of the upper side fixing component and defining an opening part for permitting the lens to insert in a central side of the lens driving device;
wherein the lens support comprises a plurality of clamping parts extending upwardly from a mounting surface for the upper spring to mount; the magnet yoke comprises a plurality of bending parts extruding from an edge part of the opening part to a lower side, the plurality of bending parts are located upper than the mounting surface, and movements along directions perpendicular to the optical axis of the plurality of bending parts are limited by the plurality of clamping parts;
wherein each clamping parts comprises a substantially rectangle arc board and two side boards which all extend upwardly from the mounting surface; one side edges of the two side boards are connected to two side edges of the substantially rectangle arc board to form a U-shape, and the other side edges of the two side boards are at an outer side in the radial direction than the substantially rectangle circular arc board; each bending part inserts between the two side boards of a corresponding clamping parts.

* * * * *